United States Patent [19]

Brown

[11] Patent Number: 4,881,334
[45] Date of Patent: Nov. 21, 1989

[54] VIEWER

[76] Inventor: Morrie Brown, R.D. 1, Box 220A, Palisades, N.Y. 10964

[21] Appl. No.: 288,236

[22] Filed: Dec. 22, 1988

Related U.S. Application Data

[63] Continuation-in-part of Ser. No. 56,156, Jun. 1, 1987, abandoned.

[51] Int. Cl.$^4$ ............................................. G02B 27/04
[52] U.S. Cl. ...................................... 40/365; 350/250
[58] Field of Search .................. 40/364, 365; 350/250, 350/140

[56] References Cited

U.S. PATENT DOCUMENTS

| | | | |
|---|---|---|---|
| 1,281,746 | 10/1918 | Allen et al. | 350/140 |
| 2,403,747 | 7/1946 | O'Gorman | 40/365 |
| 2,543,240 | 2/1951 | Hutchinson | 40/365 |
| 2,616,333 | 11/1952 | Tinker | 350/140 |
| 2,696,754 | 12/1954 | Mamock | 350/250 |
| 2,809,452 | 10/1957 | Brown | 40/365 |
| 2,859,548 | 11/1958 | Pruner | 40/364 |
| 3,438,698 | 4/1969 | Triggs | 350/250 |
| 3,553,866 | 11/1968 | Redford et al. | 40/365 |
| 3,562,939 | 7/1968 | Jacobs, Jr. et al. | 40/365 |
| 3,756,699 | 9/1973 | Martin | 350/250 |
| 4,365,432 | 12/1982 | McCauley et al. | 40/365 |
| 4,435,912 | 3/1984 | Adrian et al. | 40/365 |
| 4,502,236 | 3/1985 | Adrian | 40/365 |
| 4,558,528 | 12/1985 | Cunningham | 40/365 |

FOREIGN PATENT DOCUMENTS 1216605 4/1960 France .................. 40/365

Primary Examiner—Robert Peshock
Assistant Examiner—Michael Lynch
Attorney, Agent, or Firm—Fleit, Jacobson, Cohn, Price, Holman & Stern

[57] ABSTRACT

A collapsible, extendable compact information display device includes front, rear, and side rectangular wall panels formed from a unitary blank and joined by self-hinges so as to be transferable between a lay-flat and extended parallelepiped condition. The front wall panel is separably joined to an adjacent side wall panel by a flap having glue or a pressure sensitive adhesive. Information in a highly reduced scale is carried on opposite faces of the rear wall and the separable side wall panels and is selectively viewable through a lens mounted on and registering with a central opening in the front wall panel by adjusting the relationships of the wall panels.

19 Claims, 1 Drawing Sheet

VIEWER

This application is a continuation-in-part application of application Ser. No. 056,156, filed June 1, 1987, now abandoned.

BACKGROUND OF THE INVENTION

The present invention relates generally to improvements in information display devices and the method of production, and more particularly to an improved collapsible information carrying and viewing device and its method of production.

There are many types of information which are usually carried on the person so as to be readily available for examination. These include many forms of maps, schedules, transportation information, personal information, and the like which are usually folded printed sheets or in pamphlet form and are frequently bulky, inconvenient to use, often expensive, and otherwise leave much to be desired.

SUMMARY OF THE INVENTION

It is a principal object of the present invention to provide an improved information display device and its method of production.

Another object of the present invention is to provide an improved information carrying and viewing device.

A further object of the present invention is to provide an improved compact information carrying and viewing device which is collapsible to a lay flat storing condition and extendable to an information viewing condition.

Still a further object of the present invention is to provide a compact collapsible information carrying and viewing device in which extremely large amounts of information on an extremely reduced scale are made legible and readily available.

Another object of the present invention is to provide a device of the above nature which is inexpensive, of attractive sleek appearance, easy and convenient to use, highly suitable for and adaptable to advertising, rugged, and of great versatility and adaptability.

An information display device in accordance with the present invention includes a body member transferable between a lay flat collapsed condition and an erect extended parallelepiped condition and includes front, rear, and side non-collapsible panels arranged in quadrature and joined along contiguous edges by self-hinges and formed of a unitary blank. The front panel has a central opening and the rear panel is imperforate and has on its inside face confronting the front panel information on a greatly reduced scale, not normally legible to the naked eye. A planoconvex lens is provided registering with the central opening in and secured to the front panel. The information is made legible when viewed through the lens when the body member is in its erect condition.

In the preferred form of the improved information display device, the panels are rectangular and the front and one of the side panels are separably swingably joined by a flap having a pressure sensitive adhesive on one face and hinge connected to the front or a first side panel and separably adhesively engaging the other panel. The inside and outside faces of the rear and first side panels carry reduced scale information which can be selectively viewed through the lens by erecting the body member in a reversed or normal state, with the rear panel outside or inside face confronting and parallel to the front panel or by separating the front and first side panels and shaping the body member with the first side panel inside or outside face confronting the front panel and spaced therefrom at a proper viewing distance.

The improved information viewing device is inexpensive, rugged, compact, simple, convenient to use, and capable of supporting a large amount information on relatively small carrying areas which are selectively viewable.

The above and other objects of the present invention will become more apparent when reference is made to the following description taken in conjunction with the accompanying drawings.

DESCRIPTION OF THE PREFERRED EMBODIMENT

Figure 1:
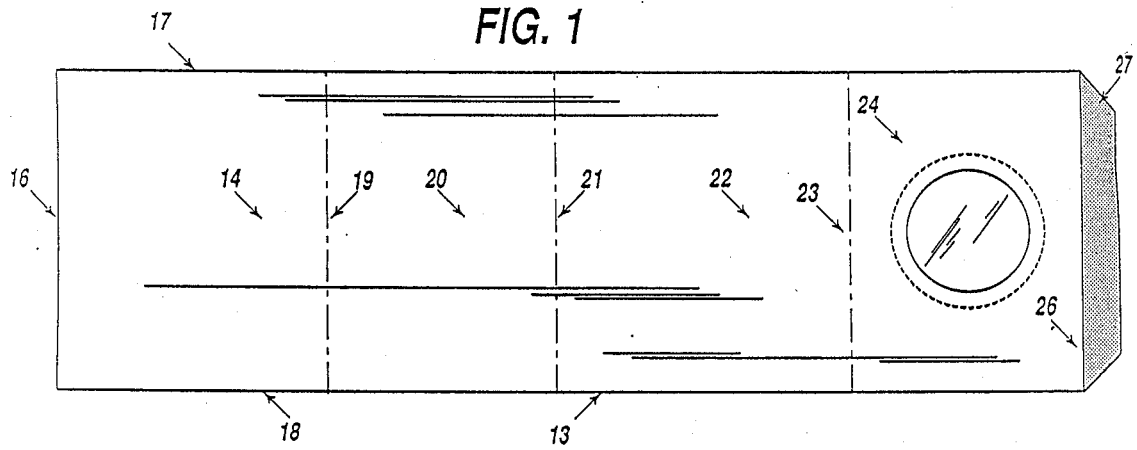
FIG. 1 is a plan view of a precut blank employed in forming the improved device.

Referring now to the drawings which illustrate a preferred embodiment of the present invention, particularly FIGS. 1 through 4, thereof, which show a first mode of operation, the reference numeral 10 generally designates the device of the present invention which includes a body member 11 and a viewing lens 12.

The body member 11 is assembled from a flat unitary precut and preformed blank 13 formed of a suitable inexpensive self-supporting material, such as a stiff paper, cardboard, or composition material or any suitable synthetic organic polymer, such as polyethylene, polypropylene, or the like. Blank 13 is of an elongated rectangular shape and is divided into successive rectangular panels and a coupling flap, by integrally formed transversely extending linear self-hinges defining fold lines. Specifically, a side wall defining rectangular front panel 14 is delineated by an end edge 16, top and bottom edges 17 and 18, respectively, of blank 13, and a first transverse fold line 19. A rear wall defining panel 20 is delineated by the blank top and bottom edges 17 and 18, transverse fold line 19 and a successive transverse fold line 21. A second side wall defining panel 22 of the same dimensions as panel 14 is delineated by the blank top and bottom edges 17 and 18, fold line 21, and the successive transverse fold line 23; and a front wall defining panel 24 is delineated by the blank top and bottom edges 17 and 18, fold line 23, and the successive transverse fold line 26, and is of about the same dimensions as rear wall panel 20.

While the dimensions of the body member 11 may vary, it is preferred that the dimensions as follows: The distance between top edge 17 and bottom edge 18 is approximate 2.125". The width of the front panel 14, i.e., the distance between edge 16 and fold 19, is approximately 1.875". Second side wall defining panel has a width equal to that of panel 14. The width of a rear wall defining panel 20, i.e., the distance between folds 19 and 21, is about 1.5". Similarly, front wall defining panel 24 has a width of about 1.5". The total length of blank 13, i.e., the distance from fold 26 and edge 16, is about 6.75".

Extending from front wall panel 24 along fold line 26 is a coupling flap 27 having on a face thereof a pressure sensitive adhesive coating 28 of any suitable composition. A circular opening is centrally formed in front wall panel 24, and viewing lens 12 of magnifying power registers with the central opening and is suitable affixed therein. Lens 12 preferably has a flat top face A substantially flush with panel 24 and a convex bottom face B extending from an inner surface of panel 24 and a flat peripheral annular flange, which is cemented or otherwise adhered to the inner surface at the border of the front wall panel central opening. Preferably, a thin annulus 15, carrying a pressure sensitive adhesive on its opposite faces initially covered by separable layers, has the layers detached and is sandwiched between the lens flange and the border of the panel opening. The lens 12 is inexpensive and may be molded of clear polystyrene or other suitable inexpensive material. The top border of lens 12 is stepped to delineate a cylindrical projection fitting the top wall circular opening.

While the dimensions of the lens 12 and circular opening may vary, it is preferred that the diameter of the circular opening is about 0.875". The diameter of the lens 12 is about 1.125". As such, the width of annulus 15 is about 0.125". The maximum distance between the flat top face A and the convex bottom face B is about 0.125".

Imprinted or otherwise applied to the inside and outside faces of rear and side wall panels 20 and 14 is any desired information 32a and 32b, respectively. Information 32a is at a highly reduced scale and of very high resolution, and which is so small as to be normally illegible but, when viewed through lens 12 at its normal viewing distance, is clear and legible. The information may be maps of any desired type, instructions, data, advertising material, or the like. Information 32b printed on panel 14 may likewise have imprinted thereon any desired information or illustrations but in a normally visible scale. Advantageously, in order to achieve a clear small picture of suitable resolution and colors, the information 32a, for example, a map, is applied by separate negatives and contains at least 2000 dots/linear inch or 4,000,000 dots/square inch, or up to, for example, 6,451,600 dots/square inch.

Advantageously, in order to achieve a clear small picture of suitable resolution and in multiple colors, the information, such as a map, is generated by extensive computer programs controlling a laser printing device capable of resolution of 6,451,600 dots per square inch or the equivalent of a 2540 line screen. In addition, the manipulation of the programs is essential in generating the color separations that normal four-color separation technology cannot perform. Further, in addition to this color separate process, the half-toning techniques are also computer-generated. Programs that control the creation of maps and other information are necessary to deliver the clarity and legibility of images at these sizes. The information is generally too small as to allow the use of standard photographic reduction techniques, color separation, or half-toning and still retain a legible image. Black-and-white images may successfully be created using standard techniques.

Figure 2:
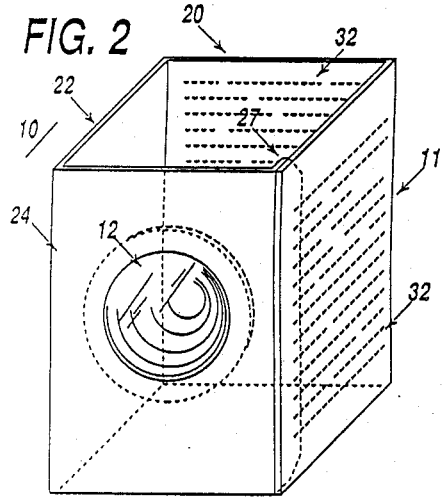
FIG. 2 is a front perspective view of the device in an erected condition in one operable mode.
Figure 5:
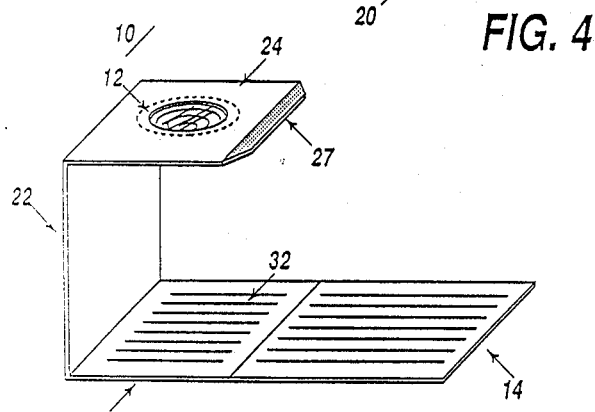
FIG. 5 is a front perspective view of the device in an open erect condition.
Figure 6:
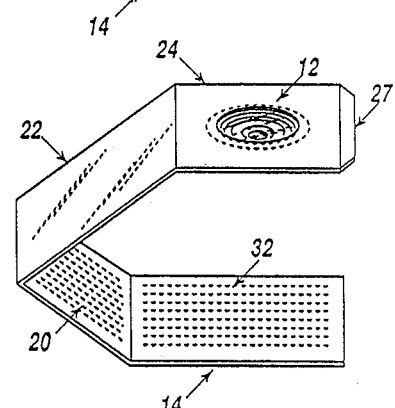
FIG. 6 is a front perspective view of the device in another mode of operation.

As shown in FIGS. 2, 5, and 6, the information 32a on panel 20 takes up substantially the entire surface of panel 20. Specifically, the information extends substantially the entire distance between folds 19 and 21, and no more than 0.25" of blank space is left between the information 32a and top and bottom edges 17 and 18, respectively.

The information 32b on panel 14 is substantially circular in shape. Moreover, circular information 32b has a diameter of about 0.875", equivalent to the diameter of the circular opening of panel 24.

The device 10 is assembled into a first operable structure mode, as shown in FIG. 2, merely by folding blank 13 about hinge lines 19, 21, 23, and 26 into a parallelepiped shape and pressing the flap adhesive coating into engagement with the end border of side wall panel 14. In this condition, the information 32a on the inside face of rear wall 20 confronting front wall 24 can be viewed and be legible through lens 12, the information carrying face being illuminated by the ambient light through one or both open ends of the device. In this erected form, the device 10 encloses a volume of about 5.97 cubic inches.

Figure 3:
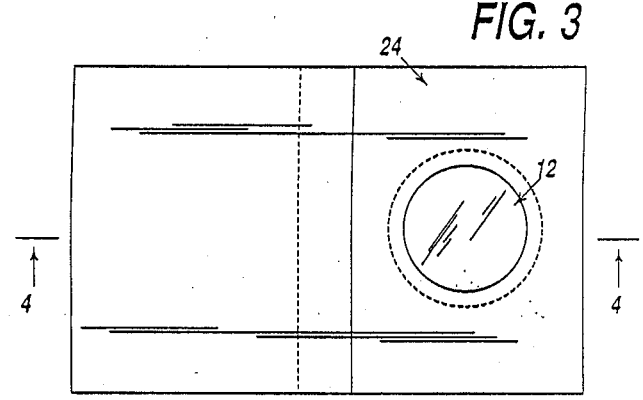
FIG. 3 is a top plan view thereof in a collapsed lay flat condition.
Figure 4:
FIG. 4 is a side elevation view of the device in the collapsed lay-flat configuration.

The information on the opposite or reverse face of rear wall 20 may be viewed through lens 12 merely by the separation of flap 27 from side wall 14 and assembling the device 10 in the manner earlier described but with the rear wall reverse face confronting front wall 24. In collapsing the device 10 into a compact condition for storage or shipping, it is pressed by swinging the panels to bring front wall 24 and side panel 22 to superimposition on the rear panel 20 and the other side panel 14, as shown in FIGS. 3 and 4. The panels are preferably so dimensioned that in the collapsed lay-flat condition of device 10, its dimensions are approximately those of the conventional credit card, that is, about 2⅛" by 33/8". As shown in FIG. 4, the device is moved to a compressed or collapsed lay-flat condition so as to align lens 12 with information 32b on panel 14 to make all of the information 32b legible The device may be erected for use by extending the assembled panels to their original operable condition.

As shown in FIG. 5, the information 32a on the face of rear wall 20 may be viewed through lens 12 without securing side wall 14 to front wall 24, but by properly positioning the lens carrying front wall with the side wall 22. Under these conditions, the observed information is exposed to additional ambient light, and the relationship between the information on the rear and side panels can be observed.

Furthermore, as shown in FIG. 6, the information 32b on either face of side panel 14 may be observed through lens 12 by positioning lens 12 above side panel 14 by angularly adjusting wall panels 20 and 22 so that front wall panel is centrally located above wall panel 14 at the proper viewing distance.

While there has been described and illustrated a preferred embodiment of the present invention, it is apparent that numerous alterations, omissions, and additions may be made without departing from the spirit thereof.

I claim:

1. An information display device comprising:
   a body member having front, rear, and first and second side panels joined along contiguous edges, said rear panel being imperforate, said front, rear, and side panels having top and bottom edges;
   a circular opening formed in the center of said front panel;

a plano-convex magnifying lens located in said central opening of said front panel and secured to said front panel on an inner surface thereof, said lens having a substantially flat surface and an oppositely facing convex surface, the lens being secured to said front panel so that said convex surface extends from said inner surface of said front panel, and said flat surface is substantially flush with said front panel;

first information printed on substantially the entire rear panel, said printed information occupying a substantially larger area of said rear panel than is occupied by said magnifying lens on said front panel;

second information printed on said first side panel;

said body member being movable into a first condition so as to adopt a parallelepiped configuration and so as to align said magnifying lens with said rear panel for making all of said first information legible when viewed through said magnifying lens, said body member being movable into a second compressed condition so as to align said magnifying lens with said second information printed on said first side panel for making said second information legible.

2. The display device of claim 1, wherein the distance between the contiguous edges of said front panel and the distance between the contiguous edges of the rear panel is 1.5 inches.

3. The display device of claim 1, wherein the distance between the top and bottom edges of said front, rear, and side panels is 2.125 inches.

4. The display device of claim 1, wherein the diameter of said circular opening of said front panel is 0.875 inches.

5. The display device of claim 1, wherein the maximum distance between said substantially flat surface and said convex surface of said lens is 0.125 inches.

6. The display device of claim 1, wherein said first information printed on said rear panel covers the surface of said rear panel entirely between the contiguous edges of said rear panel, blank space on said panel occupying no more than 0.25 inches from the top and bottom edge of said panel and said first information printed on said panel.

7. The display device of claim 1, wherein said body member is formed of a single blank of cardboard material, said contiguous edges of said front, rear, and first and second side panels defined by said folds in said blank, the entire length of said blank being no more than 6.75 inches, the distance between said bottom and top edges being 2.125 inches, the distance between folds defining said front and rear panels being 1.5 inches, and the distance between folds defining said first and second panels being 1.875 inches.

8. The display device of claim 1, wherein said first information printed on said rear panel is printed at a density of 6,451,600 dots per square inch.

9. The display device of claim 8, wherein said second information printed on said first side panel is printed at a density substantially less than that of said first information.

10. The display device of claim 1, wherein the dimensions of said device in said second condition is 2.125 inches by 3.375 inches.

11. The display device of claim 1, wherein said second condition of said device is a compressed lay-flat condition and wherein the thickness of said device is less than 0.125 inches.

12. An information display device comprising:
a body member having front, rear, and first and second side panels joined along contiguous edges, said rear panel being imperforate, said front, rear, and side panels having top and bottom edges;

a circular opening formed in the center of said front panel;

a plano-convex magnifying lens located in said central opening of said front panel and secured to said front panel on an inner surface thereof, said lens having a substantially flat surface and an oppositely facing convex surface, the lens being secured to said front panel so that said convex surface extends from said inner surface of said front panel, and said flat surface is substantially flush with said front panel;

first information printed on substantially the entire rear panel, said printed information occupying a substantially larger area of said rear panel than is occupied by said magnifying lens on said front panel and having a resolution of at least 4,000,000 dots per square inch;

second information printed on said first side panel;

said body member being movable into a first condition so as to adopt a parallelepiped configuration and so as to align said magnifying lens with said rear panel for making all of said first information legible when viewed through said magnifying lens, said body member being movable into a second compressed condition so as to align said magnifying lens with said second information printed on said first side panel for making said second information legible.

13. The display device of claim 12, wherein the distance between the contiguous edges of said front panel and the distance between the contiguous edges of the rear panel is 1.5 inches.

14. The display device of claim 12, wherein the distance between the top and bottom edges of said front, rear, and side panels is 2.125 inches.

15. The display device of claim 12, wherein the diameter of said circular opening of said front panel is 0.875 inches.

16. The display device of claim 12, wherein the maximum distance between said substantially flat surface and said convex surface of said lens is 0.125 inches.

17. The display device of claim 12, wherein said first information printed on said rear panel covers the surface of said rear panel entirely between the contiguous edges of said rear panel, blank space on said panel occupying no more than 0.25 inches from the top and bottom edge of said panel and said first information printed on said panel.

18. An information display device comprising:
a body member having front, rear, and first and second side panels joined along contiguous edges, said rear panel being imperforate, said front, rear, and side panels having top and bottom edges;

a circular opening formed in the center of said front panel;

a plano-convex magnifying lens located in said central opening of said front panel and secured to said front panel on an inner surface thereof, said lens having a substantially flat surface and an oppositely facing convex surface, the lens being secured to said front panel so that said convex surface extends from said inner surface of said front panel, and said flat surface is substantially flush with said front panel;

first information printed on substantially the entire rear panel, said printed information occupying a substantially larger area of said rear panel than is occupied by said magnifying lens on said front panel and having a resolution of at least 4,000,000 dots per square inch;

second information printed on said first side panel, said second information occupying a circular area substantially equivalent to that occupied by said magnifying lens on said front panel;

said body member being movable into a first condition so as to adopt a parallelepiped configuration and so as to align said magnifying lens with said rear panel for making all of said first information legible when viewed through said magnifying lens, said body member being movable into a second compressed condition so as to align said magnifying lens with said second information printed on said first side panel for making said second information legible.

19. The display device of claim 18, wherein said first information printed on said rear panel covers the surface of said rear panel entirely between the contiguous edges of said rear panel, blank space on said panel occupying no more than 0.25 inches from the top and bottom edge of said panel and said first information printed on said panel.

* * * * *